United States Patent [19]
Yergovich et al.

[11] Patent Number: 5,863,119
[45] Date of Patent: Jan. 26, 1999

[54] APPARATUS FOR MIXING A SLURRY WITHIN A BIOREACTOR VESSEL

[75] Inventors: Thomas W. Yergovich, Lathrop, Calif.; Ronald J. Satterfield, Pocatello, Id.

[73] Assignee: J. R. Simplot Company, Pocatello, Id.

[21] Appl. No.: 675,528

[22] Filed: Jul. 3, 1996

[51] Int. Cl.⁶ .............................. B09C 1/10; B01F 5/10; C02F 3/00
[52] U.S. Cl. ......................... 366/137; 366/173.2
[58] Field of Search .................... 366/165.5, 134, 366/136, 137, 167.1, 173.1, 173.2, 177.1, 181.6, 181.8, 182.2, 261, 342, 345, 346, 349, 159.1

[56] References Cited

U.S. PATENT DOCUMENTS

| | | | |
|---|---|---|---|
| 1,073,878 | 9/1913 | Trent | 366/137 |
| 1,135,080 | 4/1915 | Vandercook . | |
| 1,156,946 | 10/1915 | Vandercook | 366/137 |
| 1,924,126 | 8/1933 | Lofland | 366/261 |
| 2,559,518 | 7/1951 | Smith . | |
| 2,772,233 | 11/1956 | Nelson . | |
| 4,089,507 | 5/1978 | Arai et al. | 366/102 |
| 4,179,220 | 12/1979 | Rippon . | |
| 4,836,686 | 6/1989 | Sukup | 366/261 |
| 5,387,271 | 2/1995 | Crawford et al. . | |
| 5,474,380 | 12/1995 | Sukup | 366/261 |
| 5,558,434 | 9/1996 | Hamada et al. | 210/194 |

FOREIGN PATENT DOCUMENTS

| | | |
|---|---|---|
| 42 34 111 A1 | 4/1994 | Germany . |
| 94 07 972 U | 7/1994 | Germany . |
| WO 90/10602 | 9/1990 | WIPO . |
| WO 96/05003 A | 2/1996 | WIPO . |

OTHER PUBLICATIONS

Hinchee, Robert et. al., "Biological Unit Processes For Hazardous Waste Treatment", Third Internatl. In Situ And On–Site Bioreclamation Symposium, San Diego, CA, April 1995, Battelle Press, vol. 3(9), pp. 129–135.

*Primary Examiner*—Charles E. Cooley
*Attorney, Agent, or Firm*—Wells, St. John, Roberts, Gregory & Matkin, P.S.

[57] ABSTRACT

In one aspect, a soil slurry mixing apparatus comprises: a) a support structure configured to extend at least partially across a bioreactor vessel; b) at least one fluid inlet conduit supported by the support structure and configured to extend within the bioreactor vessel, the inlet conduit comprising an inlet port; c) a plurality of outlet nozzles supported by the support structure and configured to extend within the bioreactor vessel, the outlet nozzles being in fluid communication with the fluid inlet conduit and comprising outlet nozzle ports configured to be submerged beneath the surface of the slurry within the bioreactor vessel; and d) a pump in fluid communication with the fluid inlet conduit and outlet nozzles and being configured to draw soil slurry from the bioreactor vessel through the inlet conduit port and to discharge said slurry from the outlet nozzle ports to within the bioreactor vessel to mix the soil slurry within the bioreactor vessel. In another aspect, a method for mixing a slurry within a bioreactor vessel, comprises: a) providing a support structure across the bioreactor vessel, the support structure supporting one or more fluid inlet conduits and a plurality of outlet nozzles, the inlet conduits and outlet nozzles being within the bioreactor vessel, the outlet nozzles being in fluid communication with the fluid inlet conduits; b) drawing fluid from the slurry into the inlet conduits; and c) discharging said fluid into the vessel from the outlet nozzles to mix the slurry within the bioreactor vessel.

22 Claims, 8 Drawing Sheets

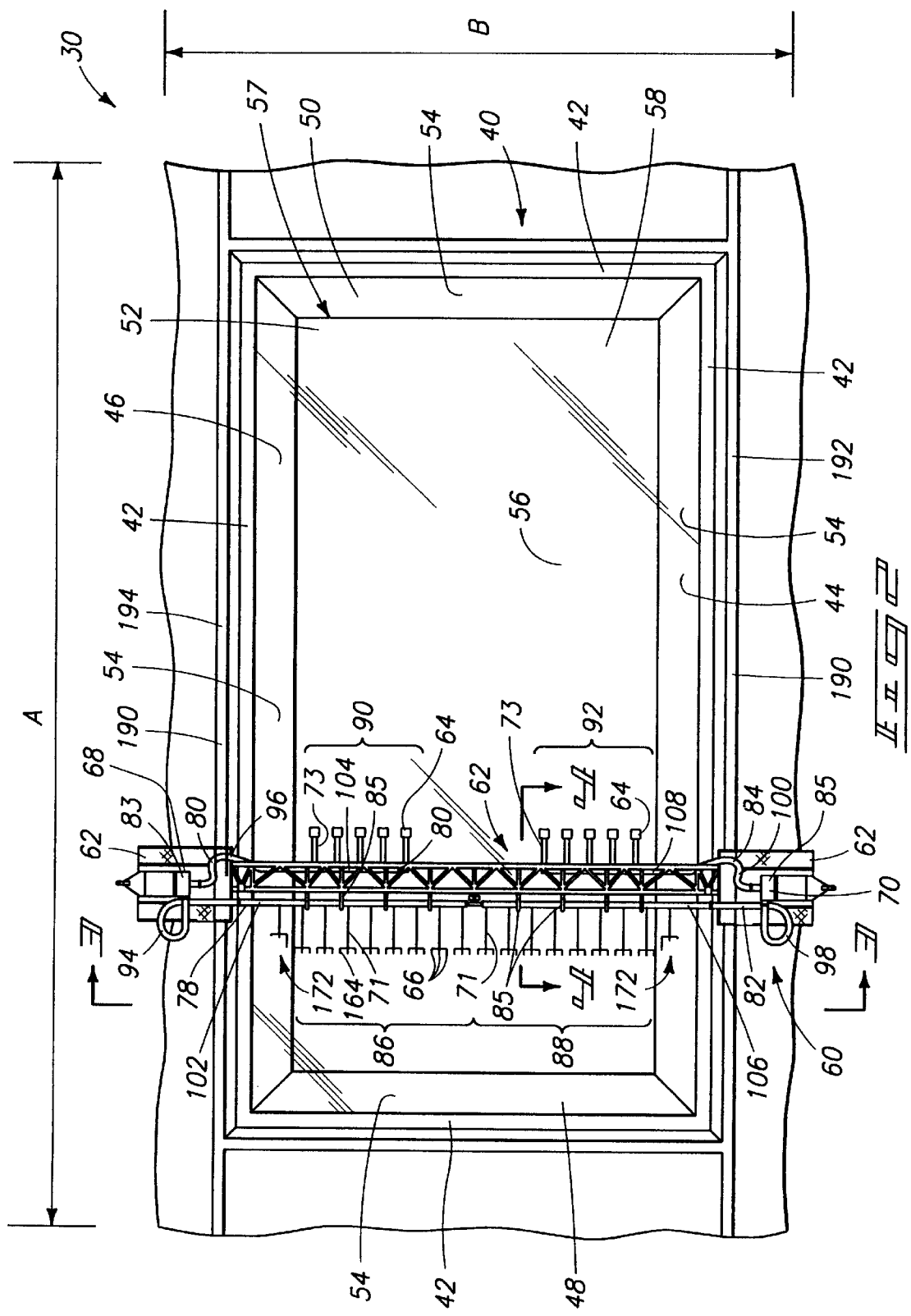

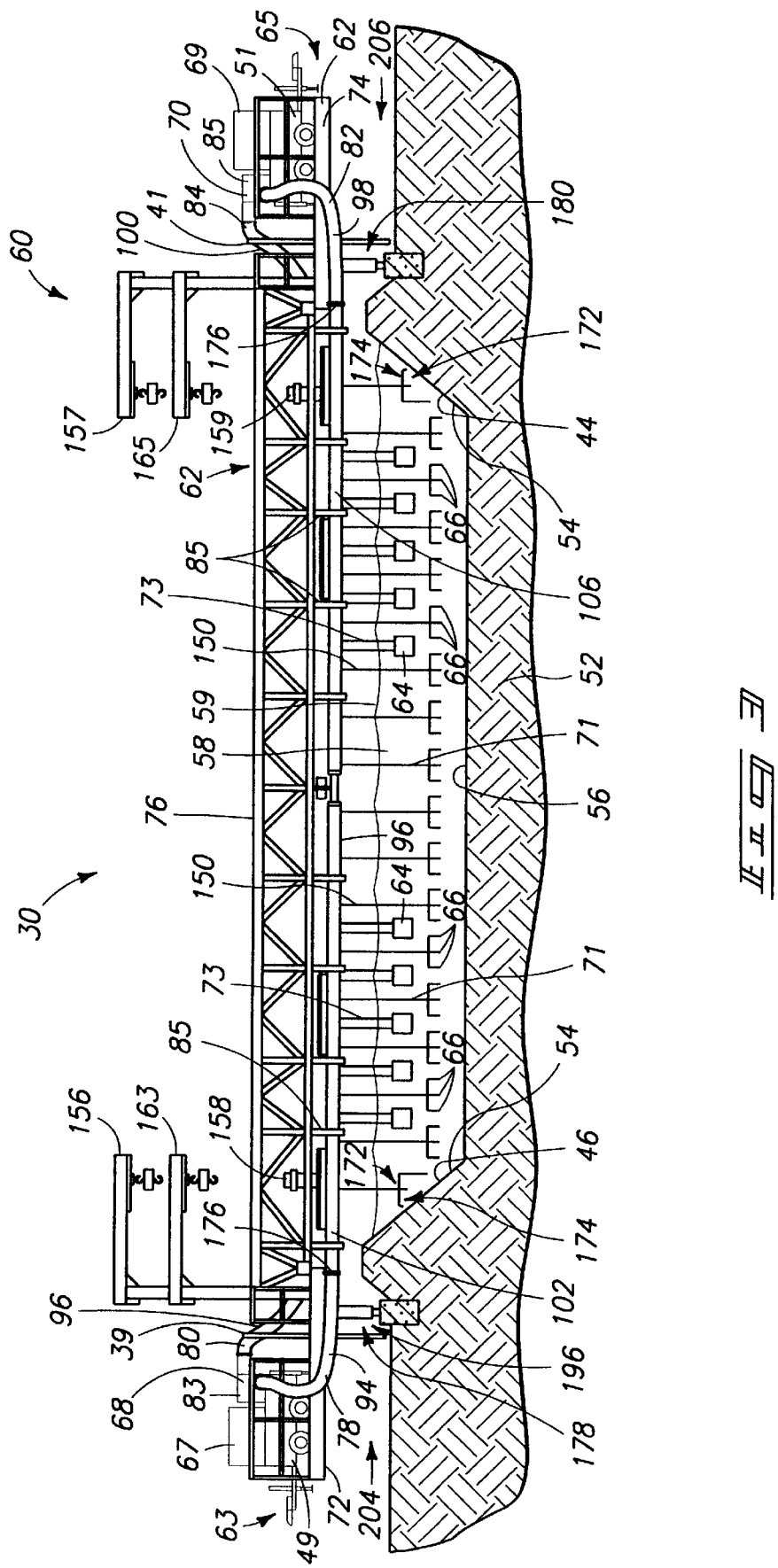

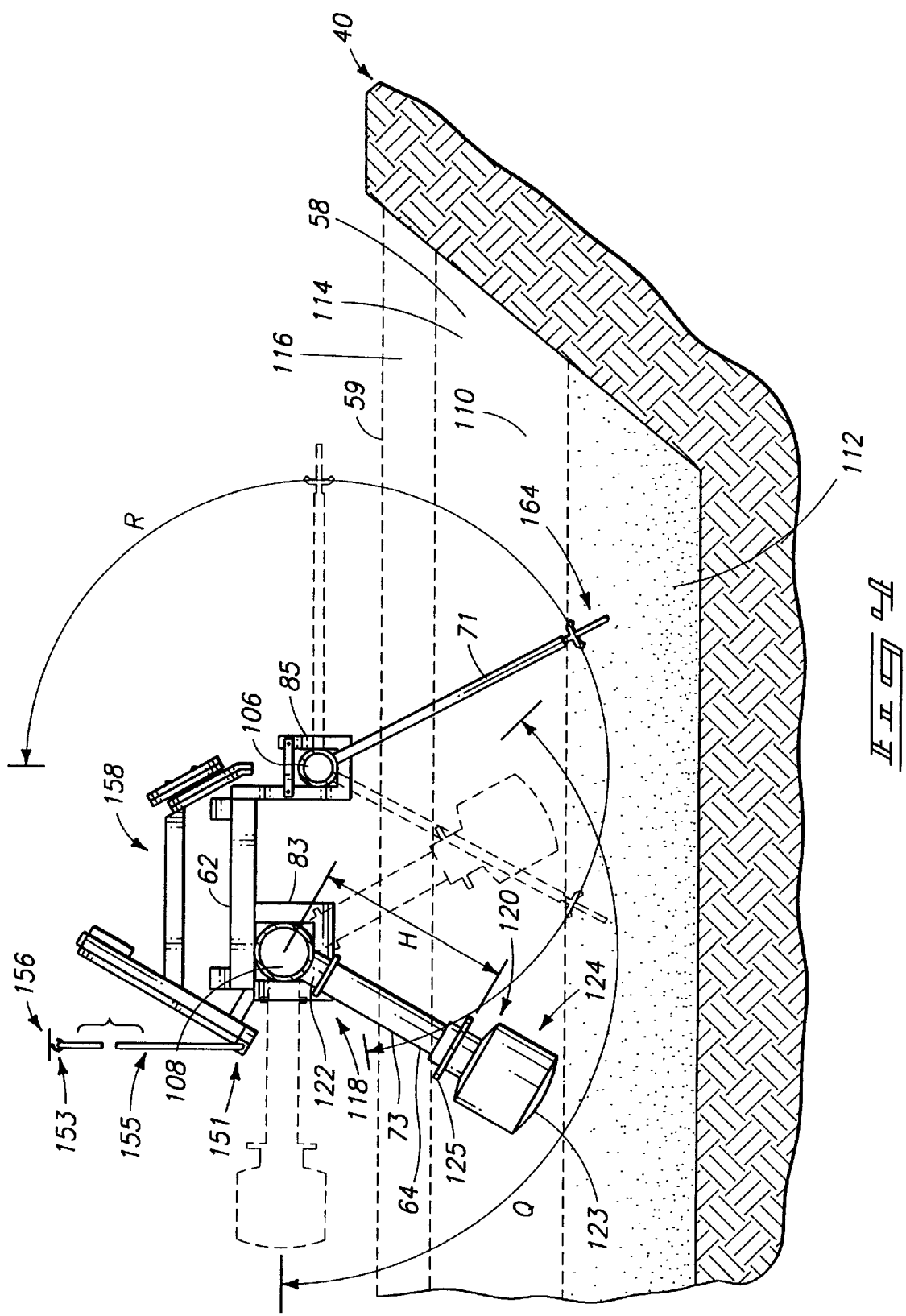

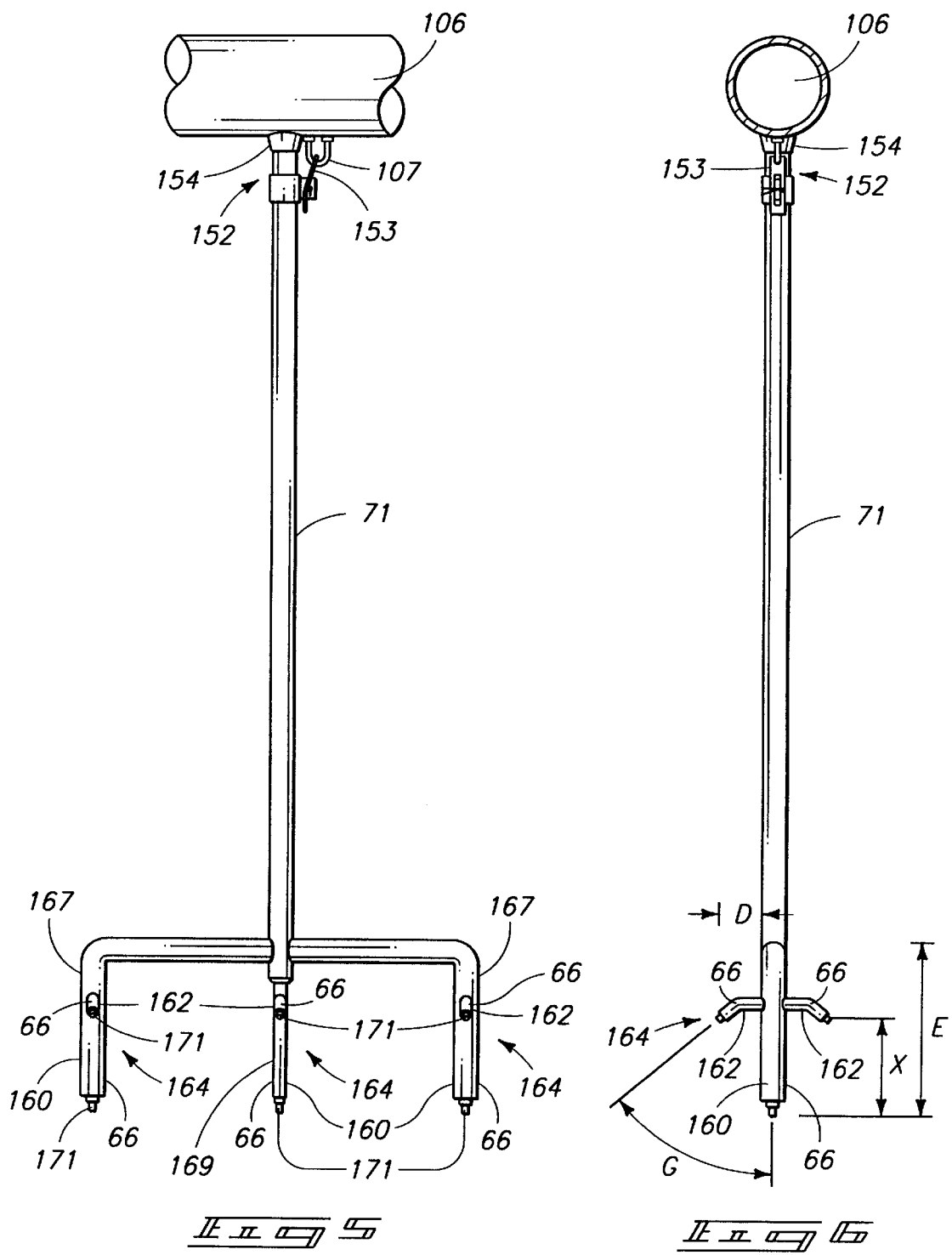

5,863,119

APPARATUS FOR MIXING A SLURRY WITHIN A BIOREACTOR VESSEL

TECHNICAL FIELD

This invention pertains to the field of slurry-mixing apparatuses, and is thought to have particular relevance to fields in which a slurry is mixed within a bioreactor vessel. The invention is thought to have particular relevance to fields in which a slurry is to be maintained substantially anaerobic as the slurry is mixed.

BACKGROUND OF THE INVENTION

Major efforts are currently being expended to clean up contaminated soils throughout the United States and the world. Such contaminated soils typically arise as industrial products or by-products are spilled either inadvertently or purposely into the environment. Commonly found contaminants are herbicides, pesticides, petroleum products and other hazardous industrial by-products. The time and expense involved in removing these contaminants from soil is frequently immense. Further, some soil types can exacerbate the problem by tightly binding with contaminants. Soils with a heavy clay content are frequently exceedingly difficult to decontaminate because of such binding actions.

Interestingly, in many contamination sites there will exist naturally-occurring microorganisms which have a capacity to aid in removal of the contaminant from the environment. Methods by which such microorganisms can aid in removal of contaminants vary. Sometimes, the contaminants are actually degraded, either partially or totally, by the microorganisms. Othertimes, the microorganisms can convert a contaminant to a substance which binds less tightly to the soil and is therefore easier to remove from the soil. In addition to the naturally-occurring microorganisms which may aid in removal of contaminants, non-naturally-occurring microorganisms may also be utilized. Such non-naturally-occurring microorganisms may sometimes be created by skilled scientists for the purpose of removing a contaminant from the environment. Example microorganisms which may be useful in remediating contaminated soils are described in U.S. Pat. No. 5,387,271, to Crawford et. al., entitled "Biological System For Degrading Nitroaromatics In Water And Soils," which is incorporated herein by reference.

In spite of the knowledge that naturally occurring and non-naturally-occurring microorganisms can aid in removal of contaminants from soils, and, in spite of frequent speculation that such microorganisms may be useful in remediating contaminated soil sites, it has been a considerable challenge to develop devices and procedures which can efficiently tap the utilities of such microorganisms. Among the problems faced are: 1) the microorganisms are frequently anaerobic so that oxygen must be substantially excluded from the environment of the microorganisms if they are to function efficiently; 2) the microorganisms, or some substance formed by the microorganisms, must generally contact a contaminant before the microorganisms can efficiently aid in removing the contaminant, so there must be efficient mixing of the microorganisms with a contaminated soil; and 3) the contaminated sites are generally enormous, possibly several square miles or larger in size. It is desirable therefore to develop methods and apparatuses which can be used in conjunction with microbiological activity to clean up contaminated soil sites.

Another set of problems facing those who would remediate contaminated soil sites concern the difficulties in preventing spillage of contaminated soil during the remediation process. Spilled contaminated soil may contaminate areas that were previously clean. Such spillage is particularly likely to occur during transport of the contaminated soil, as the soil may become a dust which is wind-blown to clean areas, or may be dribbled from open containers, or trucks, passing over the clean areas. Accordingly, it would be desirable to develop methods and apparatuses which minimize spread of contaminated soil from a remediation site during a remediation process.

Yet another set of problems facing those who would remediate contaminated soil sites arises from the remote locations of the sites. Frequently, such sites lack access to electrical power and lack nearby facilities for repair of broken equipment. Accordingly, it would be desirable to minimize the power requirements of decontamination apparatuses utilized at the sites, and to provide relatively durable decontamination apparatuses.

One method for remediating a site is to excavate the contaminated soil, haul it to a treatment vessel, decontaminate the soil in the treatment vessel, and then return the soil to the environment preferably using it to refill the site from which it was originally excavated. The reason for hauling the soil to a treatment vessel, rather than treating it in situ, is that a treatment vessel provides better control over the decontamination conditions. Such better control can lead to better decontamination of a soil.

A particular type of treatment vessel which may be used for decontaminating soils is a so-called "bioreactor vessel," which is a vessel within which microorganisms, or microorganism by-products, are utilized during the decontamination process. Example microorganisms which may be used in a bioreactor vessel are described in the U.S. Pat. No. 5,387,271. The microorganisms described in U.S. Pat. No. 5,387,271 require substantially anaerobic conditions during a degradation process. Such a requirement for anaerobic conditions during a microbial degradation process is not unusual, so it is frequently desirable to maintain substantially anaerobic conditions during microbial decontamination of a soil.

One method for maintaining such substantially anaerobic conditions, described generally in U.S. Pat. No. 5,387,271, is to mix aerobic microorganisms with the anaerobic microorganisms which will degrade the contaminant. The aerobic microorganisms scavenge oxygen from within the bioreactor vessel to render the vessel substantially anaerobic and thereby provide conditions suitable for the anaerobic microorganisms to degrade the contaminant. As long as sufficient nutrients are present to sustain the aerobic microorganisms, they will do an exceptional job of scavenging oxygen, possibly permitting a fluid within a bioreactor vessel to be left open to the atmosphere during the anaerobic degradation process. A fluid 12 comprising aerobic microorganisms and suitable nutrient is illustrated in FIG. 1.

Referring to FIG. 1, a bioreactor vessel 10 containing a fluid 12 is shown in cross-sectional side view. Fluid 12 comprises both aerobic and anaerobic microorganisms, a food source for the microorganisms, and a contaminant which is to be degraded by the anaerobic microorganisms and which will only be degraded under substantially anaerobic conditions. The bioreactor vessel comprises sides 14 and a bottom 16, but comprises no top. Accordingly, a top surface 18 of fluid 12 is exposed to the atmosphere 19, and thereby exposed to oxygen.

Due to the action of the aerobic microorganisms, oxygen which diffuses through top surface 18 of fluid 12 is quickly scavenged. Accordingly, fluid 12 becomes stratified into a substantially anaerobic lower portion 20 and a partially aerobic upper portion 22 wherein oxygen has diffused into fluid 12 and is being scavenged by the aerobic microorganisms.

A difficulty presented when soil slurries are to be decontaminated is that the soil of the slurry will settle to the bottom 16 of bioreactor vessel 10. Once the soil settles, the substantially anaerobic layer 20 is subdivided into a soil layer 24 at the bottom of the vessel, and a relatively clear layer 23 above the soil layer 24. The soil layer 24 generally takes an exceedingly long time to decontaminate because there is relatively poor mixing of microorganisms and microorganism nutrients within the contaminated soil. Also, the soil layer 24 can become quite compact, and therefore vigorous mixing may be required to uniformly disperse the soil into contact with the anaerobic microorganisms. A difficulty presented by such vigorous mixing is that the partially aerobic layer 22 may be disturbed by the mixing so that oxygen becomes dispersed throughout an entire depth of fluid 12 and thereby inhibits the decontamination activity of the anaerobic microorganisms. Accordingly, it would be desirable to develop a mixing system which could vigorously mix the lower layer 20 of fluid 12 while having substantially minimal dispersion of oxygen from level 22 into the lower level 20. It would be most desirable to develop a mixing system which enabled anaerobic microorganisms to continue to function during mixing of the lower layer 20 of fluid 12.

Another difficulty of decontaminating a soil slurry is that if the contaminated soil is not entirely exposed to substantially equal amounts of decontamination activity, certain pockets of the soil will remain contaminated while the rest of the soil becomes decontaminated. If these contaminated pockets are returned to the environment with the decontaminated soil, the remediation site may not be adequately decontaminated by a decontamination process. Accordingly, it would be desirable to develop a process which vigorously and uniformly disperses the soil layer 24 so that substantially all of the contaminated soil is exposed to substantially equal amounts of decontamination activity.

Other difficulties of decontaminating a soil slurry in a bioreactor vessel arise from the massive scale of the decontamination processes. Typical bioreactor vessels are on the order of about 30 feet wide by about 100 feet long by 3 to 5 feet deep. These vessels may be formed either above ground, as tanks, or below ground, as lined ponds. In either event, the vessels are commonly referred to as bioreactor "ponds" because of their large size. The large size of the bioreactor vessels creates substantial challenges in mixing the content of the vessels. A prior art method for mixing the content has been to provide walkways over the top of the vessels and to have persons manually move a "wand" through the content of the vessel to stir the content. The wand is generally a hollow tube connected to a pump and in fluid communication with an inlet tube extending into the fluid layer 20 of the pond. The inlet is preferably kept in the relatively clear fluid layer 23 above the soil layer 24 to lessen the probability of sucking particulate matter into the tube, as such particulate matter is likely to eventually plug the tube.

The fluid sucked into the inlet tube is expelled through the wand with a force generated by the pump. The wand generally comprises a nozzle, and this nozzle is ideally held in proximity to, or within, the soil layer 24. Thus, fluid expelled through the nozzle generates a mixing action within the layer 24 which disperses previously settled soil throughout the fluid layer 20.

Several problems are presented by this prior art method. Among these problems has been inadequate uniformity of the mixing of layer 24. A person manually moving a wand within the soil layer 24 generally does not uniformly mix the soil.

Another problem has been that persons will occasionally punch the nozzle of the wand through the soil layer 24 and into a lining at the bottom of the bioreactor vessel to thereby create a leak in the bottom of the vessel. As the material contained within the vessel is a contaminated material, it is generally undesired to have such contaminated material spilling from the bioreactor vessel into the adjacent environment.

Other prior art methods of mixing include mechanical agitation of a fluid by movement of a paddle or blade through the fluid. Such mechanical agitation is generally difficult to utilize in soil-slurry pond or vessel due to an inherent risk of punching through a lining of the pond or vessel.

For the above-discussed reasons, it would be desirable to develop an alternate mixing system for bioreactor vessels.

BRIEF DESCRIPTION OF THE DRAWINGS

Preferred embodiments of the invention are described below with reference to the following accompanying drawings.

FIG. 2 is a top view of a mixing apparatus of the present invention in combination with a bioreactor vessel. Inlet conduits and outlet nozzles of the apparatus are shown in an elevated position.

FIG. 3 is a cross-sectional side view of the mixing apparatus of FIG. 2, and a cross-sectional end view of the bioreactor vessel of FIG. 2 taken along line 3—3 in FIG. 2. Inlet conduits and outlet nozzles of the apparatus are shown in a lowered position.

FIG. 4 is a cross-sectional end view of the mixing apparatus of FIG. 2 and a partial cross-sectional side view of the bioreactor pond of FIG. 2 taken along the line 4—4 in FIG. 2. FIG. 4 illustrates a range of movement of inlet conduits and outlet nozzles of the present invention.

FIG. 5 is a side view of a stem and nozzle arrangement of the apparatus of the present invention, with the stem and nozzle arrangement shown in isolation from the rest of the apparatus.

FIG. 6 is an end view of a stem and nozzle arrangement of the mixing apparatus of the present invention, with the stem and nozzle arrangement shown in isolation from the rest of the mixing apparatus.

DETAILED DESCRIPTION OF THE PREFERRED EMBODIMENTS

Figure 1:
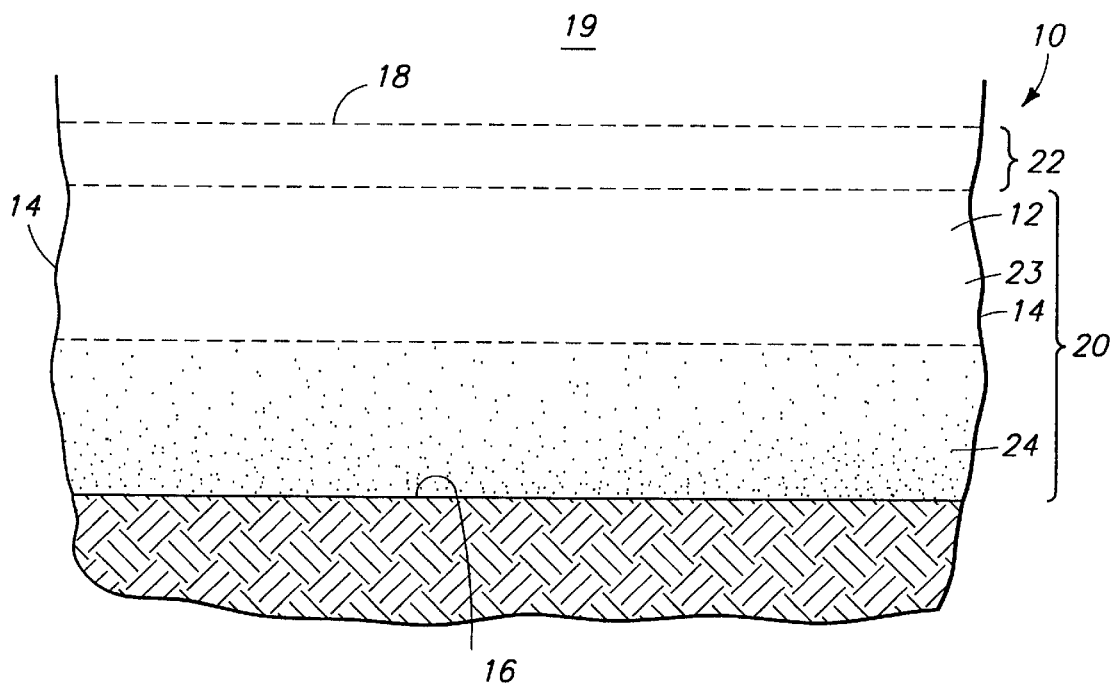
FIG. 1 is a cross-sectional side view of a bioreactor vessel of the prior art.

This disclosure of the invention is submitted in furtherance of the constitutional purposes of the U.S. Patent Laws "to promote the progress of science and useful arts" (Article 1, Section 8).

In one aspect, the invention is a soil slurry mixing apparatus for mixing a soil slurry within a bioreactor vessel, comprising:

a support structure configured to extend at least partially across the bioreactor vessel;

at least one fluid inlet conduit supported by the support structure and configured to extend within the bioreactor vessel, the inlet conduit comprising an inlet port configured to be submerged beneath a surface of the slurry within the bioreactor vessel;

a plurality of outlet nozzles supported by the support structure and configured to extend within the bioreactor vessel, the outlet nozzles being in fluid communication with the fluid inlet conduit and comprising outlet nozzle ports configured to be submerged beneath the surface of the slurry within the bioreactor vessel; and a pump in fluid communication with the fluid inlet conduit and outlet nozzles and being configured to draw soil slurry from the bioreactor vessel through the inlet conduit port and to discharge said slurry from the outlet nozzle ports to within the bioreactor vessel to mix the soil slurry within the bioreactor vessel.

In another aspect, the invention is a system for mixing a slurry, comprising:

a vessel, the vessel having a transverse axis, a longitudinal axis, and a bottom;

a support structure extending along the one of the transverse axis or the longitudinal axis of the bioreactor vessel, the support structure being further configured to move along the other of the transverse axis or the longitudinal axis of the vessel;

one or more fluid inlet conduits extending within the vessel and being supported by the support structure, the fluid inlet conduits being above the bottom of the vessel;

a plurality of outlet nozzles extending within the vessel and being supported by the support structure, the outlet nozzles being in fluid communication with the fluid inlet conduits, the outlet nozzles being above the bottom of the vessel; and a pump, the pump being in fluid communication with the outlet nozzles and inlet conduits and configured to draw fluid from the vessel into the inlet conduits and to subsequently discharge said fluid from the outlet nozzles.

In yet another aspect, the invention is a method for mixing a slurry within a bioreactor vessel, comprising:

providing a support structure across the bioreactor vessel, the support structure supporting one or more fluid inlet conduits and a plurality of outlet nozzles, the inlet conduits and outlet nozzles being within the bioreactor vessel, the outlet nozzles being in fluid communication with the fluid inlet conduits;

drawing fluid from the bioreactor vessel into the inlet conduits; and discharging said fluid into the vessel from the outlet nozzles to thereby mix the slurry within the bioreactor vessel.

More specifically, the invention pertains to a mechanical mixing apparatus for mixing a slurry within a vessel, and for preferably mixing a soil slurry within a bioreactor vessel.

The apparatus and method for mixing a slurry within a vessel is illustrated generally in FIGS. 2–10. Referring to FIGS. 2 and 3, a system 30 for mixing a slurry within a vessel 40, preferably a bioreactor vessel, is illustrated. Vessel 40 comprises a wall 42 defining an outer perimeter of the vessel. Wall 42 comprises opposing lateral sides 44 and 46, and opposing ends 48 and 50. Vessel 40 further comprises a bottom 52 joined to the wall 42. Preferably, vessel 40 will comprise the shown rectangular shape with a length of from about 80 to 500 feet and most preferably of about 300 feet, and with a width of from about 30 feet to about 100 feet and most preferably of about 80 feet. Further, the vessel 40 will preferably comprise a depth of from about 3 feet to about 10 feet, and most preferably of about 7 feet. The vessel 40 is preferably configured with a substantially fluid-impermeable wall 42 and bottom 52 so that the vessel 40 will retain a fluid 58 within an interior 57 of the vessel.

In the shown rectangular configuration of vessel 40, the vessel comprises a longitudinal axis “A” and a transverse axis “B” extending substantially perpendicular to the longitudinal axis “A”.

Vessel 40 further comprises an internal surface defined by an inner surface 54 of wall 42 and an upper surface 56 of bottom 52. The internal surface defines an internal shape of the vessel 40. As mentioned above, regarding the prior art, vessel 40 may be either an above ground tank or a below ground pond. In the shown embodiment, vessel 40 is a below ground pond, with the wall 42 and bottom 52 preferably comprising a fluid-impermeable liner (not shown). The fluid-impermeable liner will preferably comprise high density polyethylene sheets, preferably about 80 mils thick, and most preferably will comprise a double layer of the preferable 80 mil thick high density polyethylene sheets. Other materials besides high density polyethylene will be suitable, but preferably any material chosen will be non-reactive with any contaminants present in the fluid 58.

As shown, sides 44 and 46 preferably comprise an inward downward taper such that the bottom of the sides is displaced inwardly relative to the top of the sides. Also, preferably ends 48 and 50 comprise a similar inward downward taper. Such inward downward tapering of the ends and sides, 48, 50, 44 and 46, is a substantially least-cost construction which helps to prevent the sides and ends from collapsing. Although the preferred construction of ends and sides, 48, 50, 44 and 46, comprises the shown inward downward construction, other constructions are possible which lack such an inward downward construction.

System 30 further comprises a mixing device 60 extending across the vessel 40. In the shown preferred embodiment, mixing device 60 extends along the transverse axis “B” of the vessel 40. Device 60 comprises a support structure 62, fluid inlet conduits 64, outlet nozzles 66, and pumps 68 and 70. Preferably, support structure 62 is above the bioreactor vessel as shown and extends entirely across the bioreactor vessel. However, persons of ordinary skill in the art will also recognize alternative embodiments in which the support structure extends within the bioreactor vessel and in which the support structure extends only partially across the bioreactor vessel. Such constructions may include placing the support structure on a barge and floating it across a surface of a fluid 58 within a vessel 40. Also, although the vessel 40 is shown with a rectangular construction, persons of skill in the art will appreciate that the vessel could be circular. In such circular construction, the support structure could be pivotally mounted to a fixed location in the center of the vessel and rotated about the fixed location.

Support structure 62 supports the fluid inlet conduits 64 and the outlet nozzles 66 above the bottom 56 of vessel 40. The fluid inlet conduits 64 comprise inlet conduit arms 73 extending from the support structure 62. Outlet nozzles 66 extend from outlet nozzle stems 71, which are supported by support structure 62. The supported nozzles 66 and inlet conduits 64 preferably are configured to extend within the fluid 58 in the interior 57 of vessel 40.

The nozzle stems 71 are preferably horizontally offset relative to the inlet conduit arms 73. The arms 73 are preferably spaced about 36 inches from one another, and the stems 71 are preferably also spaced about 36 inches from one another, with the arms 73 being horizontally positioned about midway between adjacent stems 71. Further, the top of the outlet nozzles 66 is preferably elevationally below a bottom of the inlet conduits 64.

The horizontal offset of stems 71 and arms 73 relative to one another, and the vertical offset of the tops of outlet nozzles 66 below the bottoms inlet conduit bottoms permits the stems 71 and arms 73 to be independently rotated within the plane of longitudinal axis "A" without opportunity for an undesired contact between them. The rotation of stems 71 and arms 73 is discussed in more detail with reference to FIG. 4. With reference to FIGS. 2 and 3, it is noted that, to aid in illustrating the device 60, the outlet nozzle stems 71 and inlet conduit arms 73 are shown in a different rotational orientation in FIG. 3 than in FIG. 2.

In the shown preferred embodiment, support structure 62 extends entirely across vessel 40 and supports pumps 68 and 70, as well as supporting inlet conduit arms 73 and outlet nozzle stems 71. Support structure 62 comprises opposing ends 63 and 65, and platforms 72 and 74 at the opposing ends 63 and 65. Upon the platforms 72 and 74, pumps 68 and 70, and generators 67 and 69 rest. Ladders 39 and 41 permit access to the pumps and generators. Preferably, as shown, pump 68 and generator 67 are on a trailer 49, and pump 70 and generator 69 are on a trailer 51. Trailers 49 and 51 permit the pumps and generators to be readily transported to and from a mixing device 60.

Pumps 68 and 70 preferably generate at least 80 PSI, and preferably over 100 PSI. The described device 60 operates optimally with the pumps delivering 80 PSI into an outlet nozzle subset (the outlet nozzle subsets are described below). Pumps 68 and 70 are preferably self-powered, such as by incorporating a diesel engine into the pumps.

Generators 67 and 69 provide power to the mixing device 60 for moving the device along a pair of carriers (the carriers are described below) and for rotating the inlet conduits 64 and outlet stems 71 relative to the support structure 62 (the rotation is described below with reference to FIG. 4). Generators 67 and 69 are preferably powered by a liquid fuel, such as diesel or gasoline.

The preferable incorporation of generators 67 and 69, and self-powered pumps 68 and 70, into device 60 permits the device to operate without reliance on external sources of power. Device 60 is thereby substantially self-contained for operation at remote sites.

Support structure 62 further comprises a beam 76 extending across the vessel 40. In the shown preferred embodiment, beam 76 is a truss type structure comprising a plurality of internal triangles. Preferably, support structure 62 is formed from a rigid material, such as metal.

Preferably, support structure 62 also comprises a plurality of jib cranes 156, 157, 163 and 165, which are preferably configured to individually lift a 1000 lb. load. The jib cranes simplify loading and unloading of maintenance and repair equipment. The jib cranes are also preferably utilized for rotation of the inlet conduit arms 73 relative to structure 62, as discussed below with reference to FIG. 4.

In the shown preferred embodiment, the outlet nozzles 66 are apportioned amongst two outlet nozzle subsets 86 and 88, and the inlet conduits are apportioned amongst two inlet conduit subsets 90 and 92. The pumps 68 and 70 are apportioned amongst two pump subsets, with pump 68 comprising one pump subset and pump 70 comprising the other pump subset. Each of the pump subsets 68 and 70 is matched with an inlet conduit subset and an outlet conduit subset such that the pump subset is configured to draw fluid from the bioreactor vessel through the matched inlet conduit subset and to discharge the fluid from the matched outlet nozzle subset. Thus, a pair of conduits 78 and 80 provide fluid communication between the pump 68, the inlet conduit subset 90, and the outlet nozzle subset 86. Also, another pair of conduits 82 and 84 provide fluid communication between the pump 70, the inlet conduit subset 92, and the outlet nozzle subset 88.

Through the above-described conduit systems, pump 68 draws fluid from vessel 40 through the subset 90 inlet conduits and discharges the fluid into the vessel through the subset 86 outlet nozzles. Similarly, pump 70 draws fluid from vessel 40 through the subset 92 inlet conduits and discharges the fluid through the subset 88 outlet nozzles. The conduits 78, 80, 82 and 84 preferably comprise flexible tubing having an internal diameter of from about 6 inches to about 12 inches.

As shown, conduits 78, 80, 82 and 84 preferably comprise a pair of linked conduits, one of the linked conduits being a flexible tube 94, 96, 98 or 100, and the other being a substantially rigid tube 102, 104, 106 or 108 from which either inlet conduits or outlet nozzles extend. The rigid tubes 102, 104, 106 and 108 are preferably formed from steel. The rigid tubes 102 and 106, from which the outlet nozzle stems 71 extend, preferably have an internal diameter of about 8 inches, the nozzle stems 71, flexible tubes 94 and 98, and rigid tubes 102 and 106, forming a pair of substantially high pressure manifolds. The rigid tubes 104 and 108, from which the inlet conduit arms 73 extend, preferably have an internal diameter of from about 10 inches to about 12 inches.

Support structure 62 comprises large conduit supporters 83 (shown in FIG. 4) for supporting the substantially rigid tubes 104 and 108 from which inlet conduits tubes 73 extend, and small conduit supporters 85 (shown in FIG. 4) for supporting the substantially rigid tubes 102 and 106 from which the outlet nozzle stems 71 extend. As shown in FIG. 4, conduit supporters 83 and 85 are shelves upon which conduits 102, 104, 106 and 108 are supported, and between which inlet conduit arms 73 and outlet nozzle stems 71 extend.

Referring to FIG. 4, a soil slurry 58 within a bioreactor vessel 40 comprises a surface 59 exposed to the atmosphere. The soil slurry 58 also comprises a layer 112 of settled soil and a surface 110 between the settled soil layer 112 and a layer 114 of relatively anaerobic fluid above the settled soil layer 112. Above layer 114 is a layer 116 of partially aerobic fluid. The soil slurry 58 will typically have total depth of from about 2 to about 4 feet, and the layer 112 will typically comprise from about one-quarter to about one-half of the total depth of slurry 58. The illustrated aerobic and anaerobic layers can be achieved by methods discussed in the background section of this disclosure.

In the shown preferred embodiment, outlet nozzles 66 are connected to the stems 71 and configured such that the outlet nozzles submerge beneath the surface 59 of fluid 58 and preferably, extend beneath the surface 110 of the settled soil 112 of slurry 58. The outlet nozzles 66 and stems 71 are described in detail with reference to FIGS. 5 and 6.

Referring to FIGS. 5 and 6, the outlet nozzles are connected to support structure 62 through stems 71 which are in turn connected to the substantially rigid tube 106. Preferably, the rigid tube comprises a protrusion 154 configured for attachment to stem 71. Stem 71 connects to protrusion 154 through a fitting 52. Most preferably, fitting 152 comprises a break-away fitting such that if the nozzle 66 becomes stuck in the settled slurry 112, the stem 71 will break-away from the protrusion 154 before damage is done to either the rigid conduit 106 or the support structure 62.

Tube 106 preferably comprises the shown U-ring 107. Also, fitting 152 preferably comprises the shown detachable tether 153 configured for detachably connecting to U-ring 107. Thus, if the fitting 152 breaks away from protrusion 154, the stem 71 remains detachably connected to tube 106 through tether 153, rather than falling into the fluid 58 in vessel 40.

Stem 71 preferably comprises a channel (not shown) which is in fluid communication with both the tube 106, and the nozzles 66. Accordingly, a fluid expelled through tube 106 will flow through stem 71 and be discharged from the nozzles 66.

Outlet nozzles 66 preferably comprise the shown primary and secondary nozzles 160 and 162, respectively. The secondary nozzles 162 have a respective nozzle length "D" which is less than a length "E" of the primary nozzles 160. Each primary outlet nozzle 160 is preferably joined with a pair of secondary outlet nozzles 162 to form a trident nozzle arrangement 164 (shown in FIG. 6). Preferably, the secondary outlet nozzles 162 will extend at about a 45° angle "G" relative to the primary outlet nozzles 160 of the tridentate nozzle arrangement 164. A potential advantage of the trident nozzle arrangement 164 is illustrated in FIG. 7.

Figure 7:
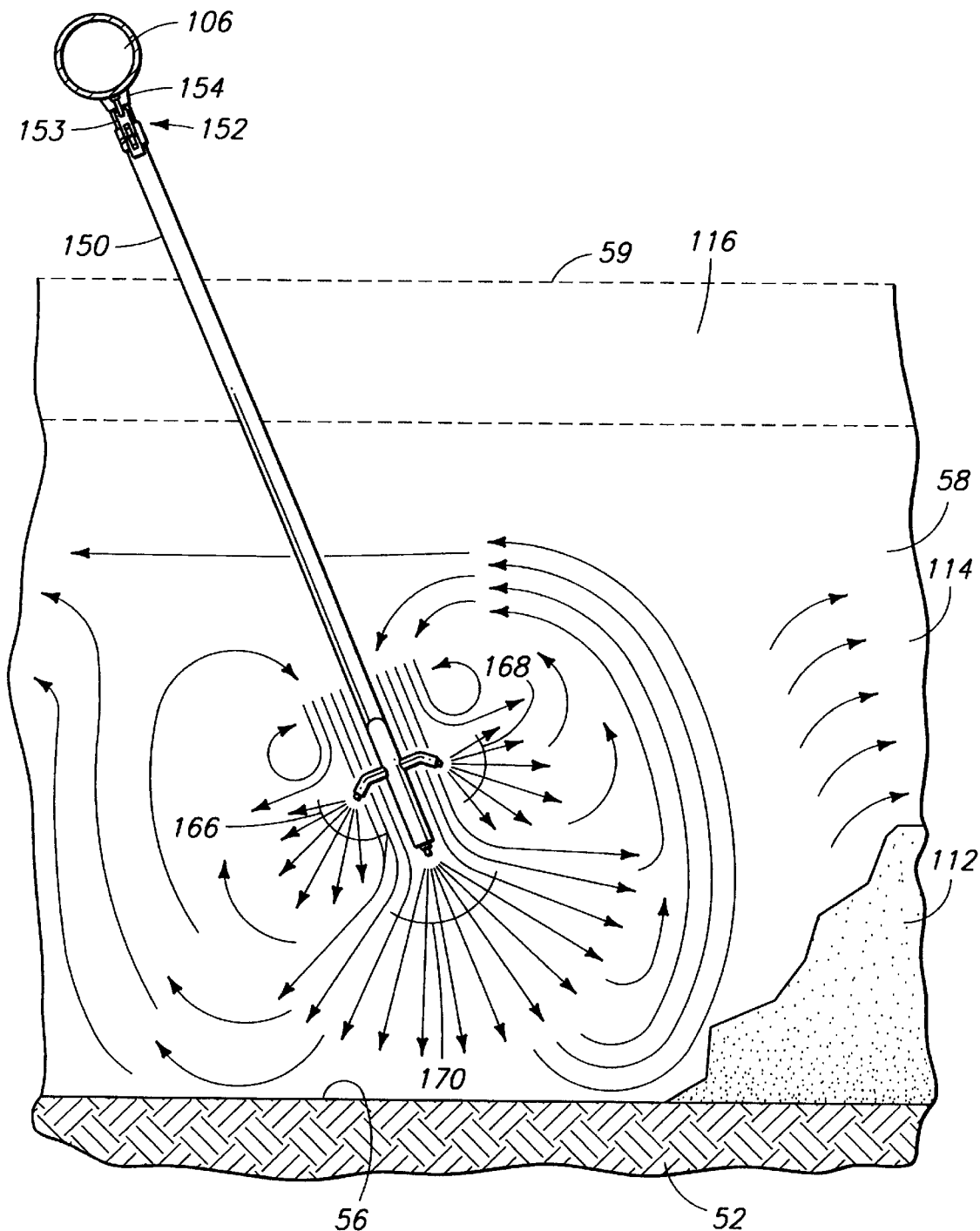
FIG. 7 is an end view of a stem and nozzle arrangement of the present invention and a partial cross-sectional side view of a bioreactor vessel, with the stem and nozzle arrangement shown in isolation, illustrating a mixing action obtained from the stem and nozzle arrangement of the present invention.

Referring to FIG. 7, each of the three nozzles of the trident nozzle arrangement 164 sprays a separate spray pattern, the three separate spray patterns being illustrated as 166, 168 and 170. The tridentate arrangement 164 is thus configured to expel a fluid in a trifurcated spray pattern, the trifurcated spray pattern comprising the spray patterns 166, 168 and 170. The shown arrows indicate fluid flow lines and illustrate how the trifurcated spray pattern advantageously vigorously sweeps a settled soil slurry 112 off of an upper surface 56 of vessel bottom 52.

Preferably, as shown, the mixing action is generally circular, so that the mixing action is kept generally below the fluid surface 59 and generally below the partially aerobic layer 116. Thus, the mixing may be generally confined to the anaerobic layer 114 when microorganisms requiring anaerobic conditions are utilized in a decontamination process. If the microorganisms utilized do not require anaerobic conditions, then the location of nozzle 66 within the vessel 40 can be varied so as to mix air into the fluid 58. For instance, as will be discussed below, the outlet nozzles are preferably rotatable relative to the support structure 62. Accordingly, the nozzles can be rotated out of the fluid 58 and used to spray fluid through the air and back into fluid 58 to generate a vigorous mixing action at the surface 59 of fluid 58 if it is desired to incorporate air into the fluid 58. Additionally, other means of introducing air into the fluid 58, known to persons of skill in the art, may be utilized. Such other means include, for example, pumping air directly into the fluid 58.

Referring again to FIG. 5, preferably a plurality of three trident nozzle arrangements are attached to a single stem 71. The plurality of three primary nozzles attached to the stem 71 comprise two outside nozzles 167 and an inside nozzle 169 between the outside nozzles. The plurality of three trident nozzle arrangements per stem has been experimentally determined to generally provide better mixing action within the vessel 40 than other arrangements in which more or less trident nozzle arrangements are attached to a single stem 71.

Preferably, during anaerobic mixing the device 62 will be configured to keep the primary outlet nozzles at from about 8 inches to about 24 inches from the upper surface 56 of bottom 52 of the vessel 40. By keeping the nozzles greater than 12 inches from the is upper surface 56, the likelihood of the nozzles inadvertently striking a protrusion of the surface is minimized. Also, by keeping the outlet nozzles within about 24 inches of the bottom 52, the disturbance of top surface 59 is substantially minimized, at least in the preferably embodiments where surface 59 is more than four feet from bottom 52, to reduce the amount of oxygen entering fluid 58.

Preferably constructions of stems 71 and nozzles 66 are as follows. Stems 71 preferably comprise a length of about 60 inches and an internal diameter of about 2 inches. The outside primary nozzles 167 comprise about a 1-¼ inch tube having about a 90° bend. The inside primary nozzle comprises about a 1 inch tube. The length "D" of the secondary nozzles is preferably from about 1.5 inches to about 2 inches, and the length "E" of the primary nozzles is preferably about 6 inches. The trident nozzle arrangement 164 comprises a distance "X" (shown in FIG. 6) from a bottom of a primary nozzle 160 to a bottom of secondary nozzle 162. The distance "X" is preferably from about 2 inches to about 10 inches, and most preferably is about 6 inches. Nozzles 66 comprise outlet ports 171 (shown in FIG. 5) where a fluid is ejected from the nozzles. Preferably, outlet ports 171 comprise an internal diameter of about one-half inch. Preferably, outlet ports 171 comprise fan jet type nozzles having about an 80° spray pattern. The outlet ports on the primary nozzles 160 are preferably fan jet type nozzles which deliver 20 gallons per minute at 60 PSI, and the outlet ports on the secondary nozzles 162 are preferably fan jet type nozzles which deliver 10 gallons per minute at 60 PSI.

Referring to FIGS. 2 and 3, the mixing device 60 will preferably be configured to complement the inner wall surface 54 of the vessel 40, and thus, when the vessel 40 comprises the shown downward inward tapered wall 42, mixing device 60 will preferably comprise one or more truncated nozzle arrangements 172 adjacent the wall 42. The truncated nozzle arrangements 172 can be configured, when desired, to comprise the shown sideways spraying nozzle arrangements 174 (shown in FIG. 3). Also, the truncated nozzle arrangements may be attached to the shown shorter stems (the stems being shorter than the regular stems 71).

The sideways spraying nozzle arrangement 174 will preferably be a tridentate nozzle arrangement similar to the downwardly spraying nozzle arrangements 164 described above with reference to FIGS. 5–7.

With downwardly spraying nozzles 164 and sideways spraying nozzles 174 incorporated into the mixing device 60, the mixing device 60 is configured to uniformly mix the entirety of a slurry 58 within vessel 40.

Referring to FIG. 4, inlet conduits 64 comprise an upper end 118, a lower end 120 and the inlet conduit arm 73 extending between the upper and lower ends. The upper end 118 is configured for attachment to a protrusion 122 extending from the substantially rigid tube 108, and the lower end is configured for connection to a self-cleaning screen assembly 124 through a fitting 125.

Some preferable dimensions of inlet conduit 64 are as follows. The inlet conduit 64 and protrusion 122 together comprise a length "H" extending from a center of tube 108 to about the bottom of the fitting 125. Length "H" is preferably from about 40 inches to about 54 inches, and most preferably about 47 inches. The outlet arm 73 preferably comprises steel, and preferably has an internal diameter of from about 3 to about 10 inches. The self-cleaning screen assembly comprises a bottom 123, which is preferably kept from about 2 feet to about 4 feet, above surface 56 of vessel bottom 52. Preferably, the self-cleaning screen 124 will be a distance above surface 56 such that the self-cleaning screen above the level 112 of the settled soil. By keeping the self-cleaning screen above layer 112 the amount of plugging of screen 124 by soil particulates in layer 112 is substantially reduced. The self-cleaning screen assembly 124 is described in detail with reference to FIGS. 9 and 10.

Figure 9:
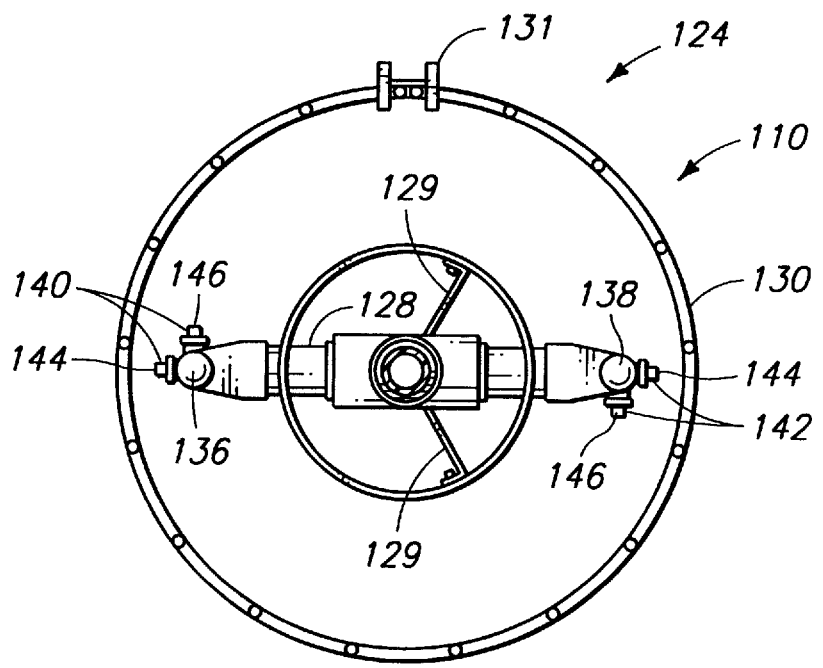
FIG. 9 is a sectional top end view of a self-cleaning screen and inlet assembly of the present invention.
Figure 10:
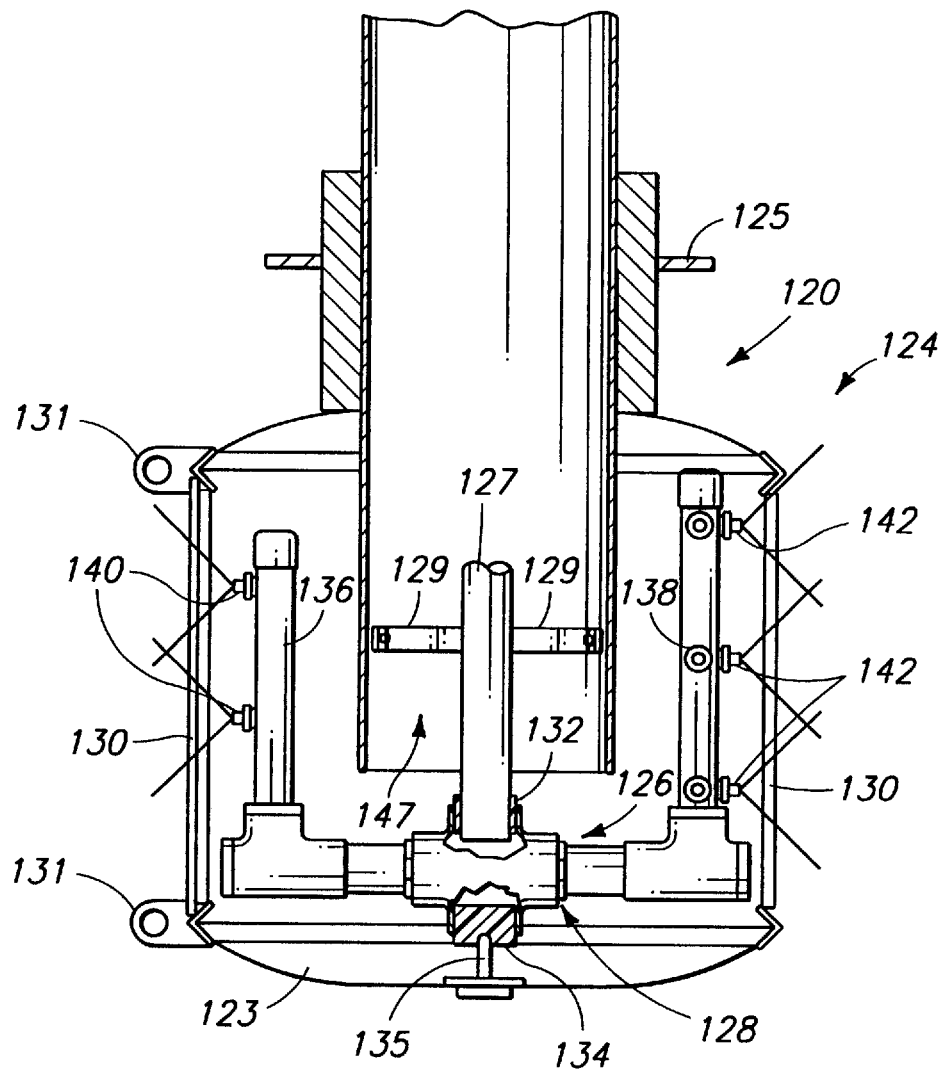
FIG. 10 is a sectional side view of the self-cleaning screen and inlet assembly of FIG. 9.

Referring to FIGS. 9 and 10, the self-cleaning screen assembly 124 comprises the fitting 125 for connection adjacent the lower end 120 of inlet conduit arm 73. The inlet conduit arm 73 preferably extends through the fitting 125 and terminates in an inlet port 147 within the self-cleaning screen assembly 124.

Self-cleaning screen assembly 124 further comprises a cylindrical lateral wall 130, and a tubing assembly 126 interiorly of the wall 130. Wall 130 preferably comprises about a 10 mesh screen. The wall 130 preferably comprises metal, and most preferably comprises a single sheet of material wrapped into a cylindrical configuration and fastened into the cylindrical configuration with one or more clips 131.

The tubing assembly 126 is in fluid communication with a fluid discharge tube 127 which extends along the inlet conduit arm 73. In the shown preferred embodiment, the fluid discharge tube 127 extends within inlet conduit arm 73 and is supported within the conduit by fluid discharge tube brackets 129. Preferably, fluid discharge tube 127 is in fluid communication with one of the outlet nozzle conduit systems 78 or 82 such that fluid pumped through the conduit systems is also pumped down discharge tube 127 and into the tubing assembly 126. Most preferably, the fluid entering discharge tube 127 will be passed through a cyclone separator and a basket screen prior to expulsion of the fluid from nozzles 144 and 146 (the nozzles are discussed below). The cyclone separator and basket screen substantially remove particulate materials large enough to plug nozzles 144 and 146 from the fluid before the fluid enters nozzles 144 and 146. Accordingly, the basket screen preferably has a mesh size smaller than outlets of nozzles 144 and 146. Preferably, nozzles 144 and 146 are fan-jet nozzles comprising an internal diameter of from 0.05 to 0.3 inches.

The tubing assembly 126 is rotatably mounted to discharge tube 127 through a top bushing 132. The tubing assembly 126 is also rotatably mounted to the bottom 123 of screen assembly 124 through a bottom bushing 134. Bottom bushing 134 is in turn mounted on a pin 135 which elevates the bottom bushing 134 from bottom 123. Such elevation of bottom bushing 134 keeps the bottom bushing substantially above a layer of soil (not shown) which frequently accumulates in the bottom 123 of screen assembly 124 and which could impede rotation of tubing assembly 126 about bottom bushing 134. Bushings 132 and 134 preferably comprise ultra high molecular weight polyethylene.

The tubing assembly 126 preferably comprises a lower tube 128 and a laterally opposing pair of side tubes 136 and 138. Side tubes 136 and 138 comprise nozzle assemblies 140 and 142, respectively. The nozzle assemblies each comprise outwardly spraying nozzles 144 configured to spray substantially outwardly, and perpendicular spraying nozzles 146 configured to spray substantially perpendicularly to the outward direction of spray of the outward spraying nozzles. Ejection of a fluid from the perpendicular spraying nozzles 146 causes the tubing assembly 126 to rotate within the screen assembly 124, while ejection of fluid from the outwardly spraying nozzles 144 cleans debris from the screen 130.

In the shown preferred embodiment side tube 136 comprises two outwardly spraying nozzles and side tube 138 comprises three outwardly spraying nozzles. The outwardly spraying nozzles of side tube 136 are preferably at elevations equivalent to about midway between elevations of the outwardly spraying nozzles of tube 138. Accordingly, as the tubing assembly 126 rotates, substantially all of the screen 130 is sprayed by a fluid ejected from nozzles 144.

Experimentally, it has been found that the described self-cleaning screen assembly is capable of filtering about 1000 gallons of slurry per minute. However, the unit is preferably run at 500 gallons per minute to reduce the likelihood of the screen 130 becoming plugged.

Referring again to FIG. 4, the inlet conduit arms 73 and outlet nozzle stems 71 are preferably pivotally connected to the support structure 62. Such pivotal connection permits the outlet nozzles 66 and inlet conduits 64 to be moved curvilinearly relative to a portion of the support structure 62. The curvilinear motion is within a plane of the longitudinal axis "A".

In the shown preferred embodiment, each of the rigid tubes 102, 106, 104 and 108 is a separately pivotal unit, allowing each of the subsets 86, 88, 90 and 92 to be moved independently relative to the other subsets. Also, because the subsets pivot as a unit, each of the nozzles and conduits within each subset rotate relatively in unison.

Preferably, as shown, the rotation of inlet conduit arms 73 and nozzle stems 71 will enable the self-cleaning screen assembly 124 and the nozzles 66 to be elevated entirely out of the fluid 58. This simplifies cleaning of the device 60, specifically of the screens 124 and nozzles 66, and also simplifies transport of the device into and out of a vessel 40. Most preferably, the inlet conduit arms 73 will be rotatable about an angle "Q" of approximately 135°, and the outlet nozzle stems will be rotatable about an angle "R" of approximately 260°. Such a wide angle of rotation enhances the versatility of the device 60.

A preferred mechanism for rotation of the inlet conduits 64 relative to support structure 62 is described with reference to FIGS. 3 and 4. A pair of jib cranes 156 and 157 are configured to overhang the relatively rigid tubes 104 and 108, respectively. Attached to tubes 104 and 108 are counterweight assemblies 158 and 159, respectively. Referring to FIG. 4, a cable 155 is extended from a hook 153 of jib crane 156 to an eye 151 of counterweight assembly 158. Cable 155 is pulled with a winch (not shown) to rotate the inlet conduit 64 clockwise, and out of fluid 58. When inlet conduit 64 reaches a desired elevation relative to the fluid 58, the inlet conduit is locked into place with a locking system (not shown). To rotate the inlet conduit 64 counterclockwise, the locking system is simply released, preferably with a cable 155 attached between the jib crane and the counterweight to permit control of the rotation of inlet conduit 64, and the weight of inlet conduit 64 pulls the conduit downwardly and counterclockwise. The counterweight assemblies 158 and 159 are preferably configured to offset the weight of conduits 64 so that the conduits 64 may be rotated by 1000 lb capacity jib cranes.

A slightly different mechanism is provided utilized to rotate the outlet nozzles 66 relative to the support structure 62. As the outlet nozzles 66 and stems 71 tend to be lighter than the conduits 64, the nozzles and stems can be rotated with a DC motor (not shown). Preferably, counterweight systems similar to the systems 158 and 159 will be provided adjacent the tubes 102 and 106 to aid in rotating the nozzles 66 and stems 71, and preferably a separate DC motor will be provided for rotating each tube 102 and 106. Also preferably, mechanisms (not shown) for providing mechanical leverage for the DC motors will be coupled between the DC motors and the tubes, 102 and 106, to aid in rotation of the nozzles 66 and stems 71. An example mechanism for providing such mechanical leverage is a gear reducer.

The pivotal mounting of stems 71 and outlet tubes 73 to structure 62 provides a controllable mechanical back and forth motion of the inlet nozzles 66 and inlet conduits 64. Such mechanical back and forth motion may be utilized for mixing a soil slurry within the vessel 40.

Figure 8:
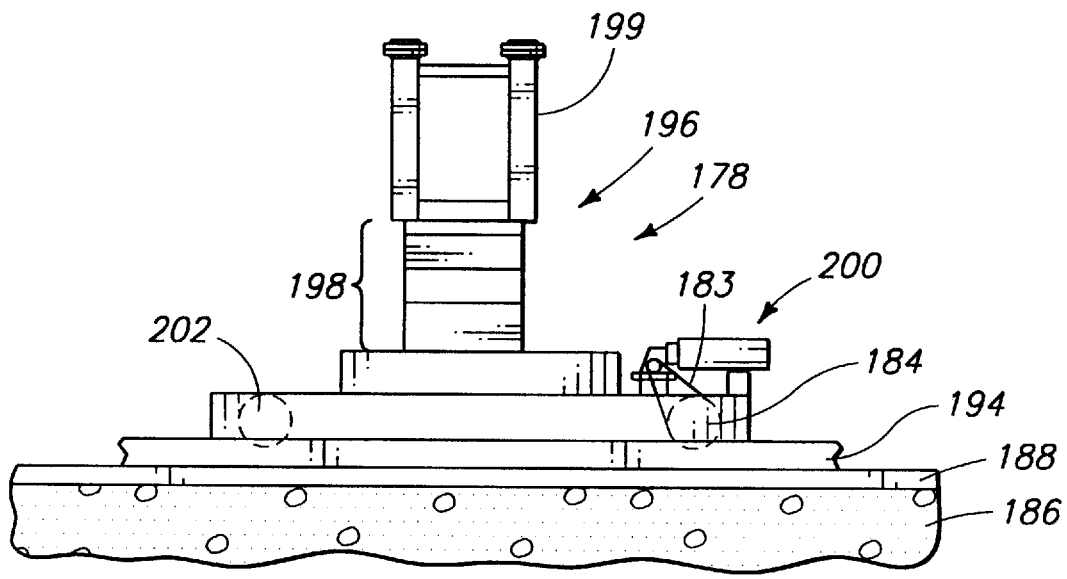
FIG. 8 is a side view of a carrier apparatus of the present invention.

Referring to FIGS. 3 and 8, the mixing device 60 is preferably elevated on a pair of carriers 178 and 180 so that the device may be moved relative to the vessel 40. In the embodiment of FIG. 8, the carrier 178 is shown in a view looking from the outside of vessel 40 toward the inside of vessel 40. The carrier 178 comprise a track 194, a pair of wheels 184 and 202 (shown in phantom), and a sprocket assembly 183 configured to drive one of the wheels. Preferably, the carrier will comprise a gantry crane end truck. Thus, track 194 will comprise a pair of rails and the wheels 184 and 202 will roll on the rails and slide between the rails. Also, wheels 184 and 202 will comprise a pair of opposing outer flanges that substantially prevent the wheel 184 from being pulled out of the rails.

Rails 194 are mounted onto a flat steel plate 188. Steel plate 188 is preferably an 8 inch wide, one-half to three-quarter inch thick plate. Steel plate 188 is mounted over a concrete footing 186. Concrete footing 186 is preferably about 18 inches wide by about 24 inches deep, and has been found to not require rebar reinforcement for application to the present invention. The steel plate 188 is preferably bolted to the footing 186 with one-half inch diameter, 4 inch long lag bolts, preferably spaced every 6 feet on alternate sides of the footing.

Attached to the sprocket assembly 183 is a motor 200, configured to rotate the sprocket assembly and drive the carrier 178 along the track 194. Preferably, motor 200 is powered by the generator 67.

The carrier apparatus 178 further comprises a pillar assembly 196 configured to support the structure 62. Preferably, the pillar comprises a removable component 198 and a support structure attachment 199. Support structure attachment 199 is configured to attach to the support structure 62, and removable component 198 is configured to be replaced with a smaller or larger removable component to adjust the height of structure 62. By such adjustment of the height of structure 63, the structure can be configured for use in below-ground ponds or above-ground tanks. Support structure attachment 198 and removable component 198 preferably comprise metal.

Carrier apparatus 180 is preferably substantially identical to the apparatus 178. Accordingly, the two carrier apparatuses 178 and 180 are preferably independently motorized, and thus configured for independent movement relative to one another. To prevent the carrier apparatuses from becoming misaligned relative to one another, an alignment mechanism 190 is provided. In the shown preferred embodiment, alignment mechanism 190 comprises the track 194 for carrier 178, and a similar track 192 for carrier 180. Tracks 192 and 194 are along the opposing lateral sides 44 and 46 of vessel 40. The tracks prevent the device 60 from slipping transversely (i.e., sideways) relative to pond 40 but do not prevent one of the carriers 178 and 180 from traveling faster than the other carrier. Accordingly, the alignment mechanism 190 preferably also comprises a series of sensors (not shown) arranged to detect the relative speed of the first and second carriers 178 and 180. The sensors preferably relay a signal indicative of the relative speed of the first and second carriers to a control mechanism (not shown) configured to vary the relative movement of the first and second carriers depending on the signal received from the sensors. Preferably, the sensors comprise photodetectors, as such are readily available and relatively rugged sensor mechanisms.

In a most preferred embodiment, the device 60 is configured to not only move nozzles 66 and inlet conduits 64 longitudinally through the vessel 40, but also to shift the nozzles and inlet conduits laterally within the vessel 40. Such longitudinal motion and lateral shifting aid in mixing a soil slurry within the vessel, and particularly aid in disrupting a settled soil layer 112. Most preferably, the side ejecting nozzles 174 will be configured to be from about 8 to about 24 inches from the sidewalls 44 and 46 as the device 60 is shifted from one sidewall to the other. Accordingly, the side ejecting nozzle 174 of subset 86 will be preferably be about 8 inches from sidewall 46 when the side ejecting nozzles 174 of subset 80 are about 24 inches from sidewall 44. Subsequently, the device 60 will preferably shift laterally such that the side ejecting nozzles 174 of subset 88 move to about 8 inches from sidewall 44 and side ejecting nozzles 174 of subset 86 correspondingly move to about 24 inches from sidewall 46. Such lateral motion of device 60 can be accomplished by a number of mechanisms known to persons of skill in the art. A preferred mechanism is to shift the substantially rigid tubes 102, 104, 106 and 108 relative to the beam 76, so that energy is not expended shifting the entire weight of the beam 76.

Through longitudinal motion of device 60 through vessel 40, lateral motion of device 60 relative to vessel 40, and curvilinear motion of the inlet conduits 64 and nozzles 66 relative to the support structure 62, the device 60 is capable of generating three different types of motions of the outlet nozzles 66 and the inlet conduits 64 to aid in stirring a settled soil slurry 112. Such three types of motions are in addition to the mixing actions generated by ejecting fluid from the trident nozzle arrangements 164. Thus, the device 60 of the present invention generates a number of mixing operations within a vessel 40 to thereby thoroughly the uniformly mix a soil slurry within the vessel for rapid microbial decontamination of the soil slurry within the bioreactor vessel.

It is noted that the mixing apparatus 60 may be run continuously or intermittently for mixing a slurry 58 within vessel 40. If the device is run intermittently, it generally takes a longer for microbial action to decontaminate a contaminated slurry 58. However, as the expense of maintaining apparatus 60 may frequently be reduced by utilizing the apparatus 60 intermittently instead of continuously, it is frequently more economical, and therefore preferred, to use apparatus 60 for intermittent mixing rather than for continuous mixing.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A soil slurry mixing apparatus for mixing a soil slurry within a bioreactor vessel, comprising:

a support structure configured to extend at least partially across the bioreactor vessel;

at least one fluid inlet conduit supported by the support structure and configured to extend within the bioreactor vessel, the inlet conduit comprising an inlet port configured to be submerged beneath a surface of the slurry within the bioreactor vessel;

a plurality of outlet nozzles supported by the support structure and configured to extend within the bioreactor vessel, the outlet nozzles being in fluid communication with the fluid inlet conduit and comprising outlet nozzle ports configured to be submerged beneath the surface of the slurry within the bioreactor vessel;

a pump in fluid communication with the fluid inlet conduit and outlet nozzles and being configured to draw soil slurry from the bioreactor vessel through the inlet conduit inlet port and to discharge said slurry from the outlet nozzle ports to within the bioreactor vessel to mix the soil slurry within the bioreactor vessel; and at least one stem connected to the support structure by a break-away fitting, wherein the outlet nozzles are joined to the at least one stem.

2. A soil slurry mixing apparatus for mixing a soil slurry within a bioreactor vessel, comprising:

a support structure configured to extend at least partially across the bioreactor vessel;

at least one fluid inlet conduit supported by the support structure and configured to extend within the bioreactor vessel, the inlet conduit comprising an inlet port configured to be submerged beneath a surface of the slurry within the bioreactor vessel;

a plurality of outlet nozzles supported by the support structure and configured to extend within the bioreactor vessel, the outlet nozzles being in fluid communication with the fluid inlet conduit and comprising outlet nozzle ports configured to be submerged beneath the surface of the slurry within the bioreactor vessel;

a pump in fluid communication with the fluid inlet conduit and outlet nozzles and being configured to draw soil slurry from the bioreactor vessel through the inlet conduit inlet port and to discharge said slurry from the outlet nozzle ports to within the bioreactor vessel to mix the soil slurry within the bioreactor vessel; and at least two stems connected to the support structure, wherein two or more of the outlet nozzles are joined to an individual stem of the at least two stems.

3. A soil slurry mixing apparatus for mixing a soil slurry within a bioreactor vessel, comprising:

a support structure configured to extend at least partially across the bioreactor vessel;

at least one fluid inlet conduit supported by the support structure and configured to extend within the bioreactor vessel, the inlet conduit comprising an inlet port configured to be submerged beneath a surface of the slurry within the bioreactor vessel;

a plurality of outlet nozzles supported by the support structure and configured to extend within the bioreactor vessel, the outlet nozzles being in fluid communication with the fluid inlet conduit and comprising outlet nozzle ports configured to be submerged beneath the surface of the slurry within the bioreactor vessel;

a pump in fluid communication with the fluid inlet conduit and outlet nozzles and being configured to draw soil slurry from the bioreactor vessel through the inlet conduit inlet port and to discharge said slurry from the outlet nozzle ports to within the bioreactor vessel to mix the soil slurry within the bioreactor vessel; and at least one stem connected to the support structure, wherein the outlet nozzles are joined to the at least one stem, wherein the at least one stem comprises a fluid channel in fluid communication with the outlet nozzles joined to the stem.

4. A soil slurry mixing apparatus for mixing a soil slurry within a bioreactor vessel, comprising:

a support structure configured to extend at least partially across the bioreactor vessel;

at least one fluid inlet conduit supported by the support structure and configured to extend within the bioreactor vessel, the inlet conduit comprising an inlet port configured to be submerged beneath a surface of the slurry within the bioreactor vessel;

a plurality of outlet nozzles supported by the support structure and configured to extend within the bioreactor vessel, the outlet nozzles being in fluid communication with the fluid inlet conduit and comprising outlet nozzle ports configured to be submerged beneath the surface of the slurry within the bioreactor vessel;

a pump in fluid communication with the fluid inlet conduit and outlet nozzles and being configured to draw soil slurry from the bioreactor vessel through the inlet conduit inlet port and to discharge said slurry from the outlet nozzle ports to within the bioreactor vessel to mix the soil slurry within the bioreactor vessel; and at least two stems connected to the support structure, wherein the outlet nozzles are joined to the at least two stems, the outlet nozzles comprising primary outlet nozzles and secondary outlet nozzles, the primary and secondary nozzles each having a respective nozzle length, the secondary nozzle length being less than the primary nozzle length, and at least one of the secondary nozzles and one of the primary nozzles being joined to an individual stem of the at least two stems.

5. A soil slurry mixing apparatus for mixing a soil slurry within a bioreactor vessel, comprising:

a support structure configured to extend at least partially across the bioreactor vessel;

at least one fluid inlet conduit supported by the support structure and configured to extend within the bioreactor vessel the inlet conduit comprising an inlet port configured to be submerged beneath a surface of the slurry within the bioreactor vessel;

a plurality of outlet nozzles supported by the support structure and configured to extend within the bioreactor vessel, the outlet nozzles being in fluid communication with the fluid inlet conduit and comprising outlet nozzle ports configured to be submerged beneath the surface of the slurry within the bioreactor vessel;

a pump in fluid communication with the fluid inlet conduit and outlet nozzles and being configured to draw soil slurry from the bioreactor vessel through the inlet conduit inlet port and to discharge said slurry from the outlet nozzle ports to within the bioreactor vessel to mix the soil slurry within the bioreactor vessel; and wherein the outlet nozzles comprise primary outlet nozzles and secondary outlet nozzles, individual primary outlet nozzles being joined with two of the secondary outlet nozzles to thereby form a plurality of trident nozzle arrangements.

6. The apparatus of claim 5 wherein the secondary outlet nozzles of an individual of the trident nozzle arrangements extend at about a 45° angle relative to the primary outlet nozzle of the individual of the trident nozzle arrangements.

7. The apparatus of claim 5 further comprising at least one stem connected to the support structure, wherein three of the trident nozzle arrangements are joined to the at least one stem.

8. The apparatus of claim 7 wherein the primary outlet nozzles are configured to be positioned at greater than about 12" from a bottom of the bioreactor vessel.

9. The apparatus of claim 7 wherein the outlet nozzles are configured to be positioned at from about 12" to about 24" from a bottom of the bioreactor vessel.

10. A soil slurry mixing apparatus for mixing a soil slurry within a bioreactor vessel, comprising:
   a support structure configured to extend at least partially across the bioreactor vessel;
   at least one fluid inlet conduit supported by the support structure and configured to extend within the bioreactor vessel, the inlet conduit comprising an inlet port configured to be submerged beneath a surface of the slurry within the bioreactor vessel;
   a plurality of outlet nozzles supported by the support structure and configured to extend within the bioreactor vessel, the outlet nozzles being in fluid communication with the fluid inlet conduit and comprising outlet nozzle ports configured to be submerged beneath the surface of the slurry within the bioreactor vessel;
   a pump in fluid communication with the fluid inlet conduit and outlet nozzles and being configured to draw soil slurry from the bioreactor vessel through the inlet conduit inlet port and to discharge said slurry from the outlet nozzle ports to within the bioreactor vessel to mix the soil slurry within the bioreactor vessel; and
   wherein the inlet conduit is covered by a self-cleaning screen.

11. A soil slurry mixing apparatus for mixing a soil slurry within a bioreactor vessel, the apparatus being configured to move relative to the bioreactor vessel and comprising:
   a support structure configured to extend at least partially across the bioreactor vessel;
   at least one fluid inlet conduit supported by the support structure and configured to extend within the bioreactor vessel, the inlet conduit comprising an inlet port configured to be submerged beneath a surface of the slurry within the bioreactor vessel;
   a plurality of outlet nozzles supported by the support structure and configured to extend within the bioreactor vessel the outlet nozzles being in fluid communication with the fluid inlet conduit and comprising outlet nozzle ports configured to be submerged beneath the surface of the slurry within the bioreactor vessel;
   a pump in fluid communication with the fluid inlet conduit and outlet nozzles and being configured to draw soil slurry from the bioreactor vessel through the inlet conduit inlet port and to discharge said slurry from the outlet nozzle ports to within the bioreactor vessel to mix the soil slurry within the bioreactor vessel;
   a first power source to power the movement of the apparatus; and
   wherein the pump comprises a second power source, and wherein the apparatus is self-contained and does not rely on external sources of power.

12. A soil slurry mixing apparatus for mixing a soil slurry within a bioreactor vessel, the apparatus being configured to move relative to the bioreactor vessel, the bioreactor vessel comprising opposing edges, the bioreactor vessel opposing edges being a first edge and a second edge, the soil slurry mixing apparatus comprising:
   a support structure configured to extend at least partially across the bioreactor vessel;
   at least one fluid inlet conduit supported by the support structure and configured to extend within the bioreactor vessel, the inlet conduit comprising an inlet port configured to be submerged beneath a surface of the slurry within the bioreactor vessel;
   a plurality of outlet nozzles supported by the support structure and configured to extend within the bioreactor vessel, the outlet nozzles being in fluid communication with the fluid inlet conduit and comprising outlet nozzle ports configured to be submerged beneath the surface of the slurry within the bioreactor vessel;
   a pump in fluid communication with the fluid inlet conduit and outlet nozzles and being configured to draw soil slurry from the bioreactor vessel through the inlet conduit inlet port and to discharge said slurry from the outlet nozzle ports to within the bioreactor vessel to mix the soil slurry within the bioreactor vessel;
   a pair of opposing ends of the support structure, the support structure opposing ends being a first opposing end and a second opposing end, the first and second opposing ends being adjacent the bioreactor vessel first and second opposing edges, respectively; and
   a pair of carrier apparatuses connected to the support structure, the carrier apparatuses being a first carrier apparatus and a second carrier apparatus, the first carrier apparatus being connected to the first support structure opposing end and the second carrier apparatus being connected to the second support structure opposing end, the carrier apparatuses being configured to move the support structure relative to the bioreactor vessel.

13. A soil slurry mixing apparatus for mixing a soil slurry within a bioreactor vessel, the apparatus being configured to move relative to the bioreactor vessel, the bioreactor vessel comprising opposing lateral sides, the opposing lateral sides being a first side and a second side, the soil slurry mixing apparatus comprising:
   a support structure configured to extend at least partially across the bioreactor vessel;
   at least one fluid inlet conduit supported by the support structure and configured to extend within the bioreactor vessel, the inlet conduit comprising an inlet port configured to be submerged beneath a surface of the slurry within the bioreactor vessel;
   a plurality of outlet nozzles supported by the support structure and configured to extend within the bioreactor vessel, the outlet nozzles being in fluid communication with the fluid inlet conduit and comprising outlet nozzle ports configured to be submerged beneath the surface of the slurry within the bioreactor vessel;
   a pump in fluid communication with the fluid inlet conduit and outlet nozzles and being configured to draw soil slurry from the bioreactor vessel through the inlet conduit inlet port and to discharge said slurry from the outlet nozzle ports to within the bioreactor vessel to mix the soil slurry within the bioreactor vessel;
   a pair of opposing ends of the support structure, the support structure opposing ends being a first end and a second end, the first and second opposing ends being adjacent the bioreactor vessel first and second lateral sides, respectively;
   a pair of carrier apparatuses connected to the support structure, the carrier apparatuses being a first carrier apparatus and a second carrier apparatus, the first carrier apparatus being connected to the first support structure opposing end and the second carrier apparatus being connected to the second support structure opposing end, the carrier apparatuses being configured to move the apparatus relative to the bioreactor vessel, the carrier apparatuses being independently motorized and thereby being configured for independent movement relative to one another; and an alignment mechanism for keeping the carrier apparatuses aligned relative to the bioreactor vessel lateral sides as the apparatus moves relative to the bioreactor vessel.

14. The apparatus of claim 13 wherein the alignment mechanism comprises a first track and a second track, the first and second tracks being along the first and second bioreactor vessel lateral sides respectively; the first carrier being matched with the first track and the second carrier being matched with the second track.

15. The apparatus of claim 13 wherein the alignment mechanism comprises:

at least one control mechanism controllably connected to one or both of the first carrier and the second carrier;

a series of sensors arranged to detect a relative movement of the first and second carriers to one another and to send a signal indicative of the relative alignment of the first and second carriers to the control mechanism; and the control mechanism being configured to vary the relative movement of the first and second carriers depending on the signal received from the sensors.

16. The apparatus of claim 15 wherein the sensors comprise photodetectors.

17. The apparatus of claim 13 wherein the alignment mechanism comprises:

at least one control mechanism controllably connected to one or both of the first carrier and the second carrier;

a series of sensors arranged to detect a relative movement of the first and second carriers to one another and to send a signal indicative of the relative alignment of the first and second carriers to the control mechanism;

the control mechanism being configured to vary the relative movement of the first and second carriers depending on the signal received from the sensors; and a first track and a second track, the first and second tracks being along the first and second bioreactor vessel lateral sides, respectively; the first carrier being matched with the first track and the second carrier being matched with the second track.

18. A soil slurry mixing apparatus for mixing a soil slurry within a bioreactor vessel and configured to move in a direction relative to the bioreactor vessel, comprising:

a support structure configured to extend at least partially across the bioreactor vessel;

at least one fluid inlet conduit supported by the support structure and configured to extend within the bioreactor vessel, the inlet conduit comprising an inlet port configured to be submerged beneath a surface of the slurry within the bioreactor vessel;

a plurality of outlet nozzles supported by the support structure and configured to extend within the bioreactor vessel, the outlet nozzles being in fluid communication with the fluid inlet conduit and comprising outlet nozzle ports configured to be submerged beneath the surface of the slurry within the bioreactor vessel;

a pump in fluid communication with the fluid inlet conduit and outlet nozzles and being configured to draw soil slurry from the bioreactor vessel through the inlet conduit inlet port and to discharge said slurry from the outlet nozzle ports to within the bioreactor vessel to mix the soil slurry within the bioreactor vessel; and wherein the outlet nozzles comprise primary outlet nozzles and secondary outlet nozzles, a pair of secondary outlet nozzles being joined with each primary outlet nozzle to thereby form a trident nozzle arrangement; the trident nozzle arrangement being configured relative to the direction of movement of the apparatus whereby one of the pair of secondary outlet nozzles leads the primary outlet nozzle and the other of the pair of secondary outlet nozzles follows the primary outlet nozzle as the apparatus moves.

19. A soil slurry mixing apparatus for mixing a soil slurry within a bioreactor vessel, comprising:

a support structure configured for extension across the bioreactor vessel;

at least two fluid inlet conduits configured for extension within the bioreactor vessel and being supported by the support structure, the fluid inlet conduits being apportioned amongst at least two inlet conduit subsets, one of the inlet conduit subsets being a first inlet conduit subset;

a plurality of outlet nozzles configured for extension within the bioreactor vessel and being supported by the support structure, the outlet nozzles being apportioned amongst at least two outlet nozzle subsets, one of the outlet nozzle subsets being a first outlet nozzle subset, the first outlet nozzle subset being in fluid communication with the first inlet conduit subset; and at least two pumps, the pumps being apportioned amongst two or more pump subsets, one of the pump subsets being a first pump subset, the first pump subset comprising a first pump and being configured to draw fluid from the bioreactor vessel through the first inlet conduit subset and to discharge said fluid from the first outlet nozzle subset.

20. The apparatus of claim 19 wherein the at least two pumps are two pumps, the first pump and a second pump; wherein the support structure comprises two opposing ends, a first end and a second end; wherein each of the first and second pumps is adjacent a respective first and second end of the support structure; wherein the at least two inlet conduit subsets are two inlet conduit subsets, the first inlet conduit subset and a second inlet conduit subset; wherein the at least two outlet nozzle subsets are two outlet nozzle subsets, the first outlet nozzle subset and a second outlet nozzle subset; and wherein the second pump is configured to draw fluid from the bioreactor vessel through the second inlet conduit subset and to discharge said fluid from the second outlet nozzle subset.

21. The apparatus of claim 19 wherein the at least two pumps are two pumps, the first pump and a second pump; wherein the support structure comprises two opposing ends, a first end and a second end; wherein the support structure comprises two halves, a first half and a second half, the first and second halves being adjacent the first and second ends respectively; wherein each of the first and second pumps is adjacent to the respective first and second halves of the support structure; wherein the at least two inlet conduit subsets are two inlet conduit subsets, the first inlet conduit subset and a second inlet conduit subset, the first and second inlet conduit subsets being attached to the first and second halves, respectively, of the support structure; wherein the at least two outlet nozzle subsets are two outlet nozzle subsets, the first outlet nozzle subset and a second outlet nozzle subset, the first and second outlet nozzle subsets being attached to the first and second halves, respectively, of the support structure; and wherein the second pump is configured to draw fluid from the bioreactor vessel through the second inlet conduit subset and to discharge said fluid from the second outlet nozzle subset.

22. A slurry mixing system, comprising:
   a bioreactor vessel having a transverse axis, a longitudinal axis, and a bottom;
   a support structure configured for extension along one of the transverse axis or the longitudinal axis of the bioreactor vessel and configured to move along the other of the transverse axis or the longitudinal axis of the vessel;
   one or more fluid inlet conduits configured for extension within the vessel and being supported by the support structure, the fluid inlet conduits being positioned elevationally above the bottom of the vessel;
   a plurality of outlet nozzles configured for extension within the vessel and being supported by the support structure, the outlet nozzles being in fluid communication with the fluid inlet conduits, the outlet nozzles being positioned elevationally above the bottom of the vessel;
   a pump in fluid communication with the outlet nozzles and inlet conduits, and being configured to draw fluid from the vessel into the inlet conduits and to subsequently discharge said fluid from the outlet nozzles; and
   wherein the outlet nozzles are joined in groups of three and are thereby trident nozzle arrangements.

* * * * *

UNITED STATES PATENT AND TRADEMARK OFFICE
CERTIFICATE OF CORRECTION

PATENT NO. : 5,863,119
DATED : January 26, 1999
INVENTOR(S) : Thomas W. Yergovich; Ronald J. Satterfield It is certified that error appears in the above-identified patent and that said Letters Patent is hereby corrected as shown below:

Col. 8, l. 65:   Replace "52" with --152--.

Col. 10, l. 2:   Delete "is".

Col. 10, l. 7:   Replace "preferably" with --preferable--.

Col. 13, l. 49:  Replace "198" (first occurrence) with --199--.

Signed and Sealed this

Sixth Day of July, 1999

Attest:

Q. TODD DICKINSON

*Attesting Officer*      Acting Commissioner of Patents and Trademarks